(12) United States Patent
Lee et al.

(10) Patent No.: US 10,817,478 B2
(45) Date of Patent: *Oct. 27, 2020

(54) SYSTEM AND METHOD FOR SUPPORTING PERSISTENT STORE VERSIONING AND INTEGRITY IN A DISTRIBUTED DATA GRID

(71) Applicant: ORACLE INTERNATIONAL CORPORATION, Redwood Shores, CA (US)

(72) Inventors: Robert H. Lee, San Carlos, CA (US); Jason John Howes, Somerville, MA (US); Mark Falco, Burlington, MA (US); Gene Gleyzer, Lexington, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 97 days.

This patent is subject to a terminal disclaimer.

(21) Appl. No.: 16/227,877

(22) Filed: Dec. 20, 2018

(65) Prior Publication Data

US 2019/0121790 A1 Apr. 25, 2019

Related U.S. Application Data

(63) Continuation of application No. 14/281,150, filed on May 6, 2014, now Pat. No. 10,176,184.

(Continued)

(51) Int. Cl.
*G06F 16/182* (2019.01)
*G06F 16/11* (2019.01)
(Continued)

(52) U.S. Cl.
CPC .......... *G06F 16/182* (2019.01); *G06F 9/5027* (2013.01); *G06F 9/5061* (2013.01);
(Continued)

(58) Field of Classification Search
None
See application file for complete search history.

(56) References Cited

U.S. PATENT DOCUMENTS 5,784,569 A 7/1998 Miller
5,819,272 A 10/1998 Benson
(Continued)

FOREIGN PATENT DOCUMENTS

EP 0928089 A2 7/1999

OTHER PUBLICATIONS

European Patent Office, International Searching Authority, International Search Report and Written Opinion dated Jan. 12, 2016 for International Application No. PCT/US2015/052060, 14 pages.

(Continued)

*Primary Examiner* — Giuseppi Giuliani
(74) *Attorney, Agent, or Firm* — Tucker Ellis LLP

(57) ABSTRACT

A system and method can support recovery of persisted data from persistent storage of a distributed data grid, and provide persistent store versioning and integrity. A coordinator in the distributed data grid can receive a plurality of identifiers from one or more members of the distributed data grid, wherein each said identifier is associated with a persisted partition in a persistent storage for the distributed data grid. Then, the coordinator can select an identifier for each partition, wherein each selected identifier is associated with a most recent valid version of a partition. Furthermore, the coordinator can determine an active member in the distributed data grid that is responsible for recovering said partition from a persisted partition associated with the selected identifier.

20 Claims, 14 Drawing Sheets

Related U.S. Application Data

(60) Provisional application No. 61/915,912, filed on Dec. 13, 2013.

(51) Int. Cl.
   *G06F 16/27*    (2019.01)
   *G06F 16/21*    (2019.01)
   *G06F 9/50*     (2006.01)
   *G06F 11/14*    (2006.01)
   *G06F 11/16*    (2006.01)
   *G06F 16/18*    (2019.01)

(52) U.S. Cl.
   CPC ...... *G06F 11/1425* (2013.01); *G06F 11/1438* (2013.01); *G06F 11/1448* (2013.01); *G06F 11/1464* (2013.01); *G06F 11/1469* (2013.01); *G06F 11/1482* (2013.01); *G06F 11/16* (2013.01); *G06F 16/128* (2019.01); *G06F 16/1858* (2019.01); *G06F 16/1865* (2019.01); *G06F 16/219* (2019.01); *G06F 16/27* (2019.01); *G06F 2201/84* (2013.01); *G06F 2209/505* (2013.01)

(56) References Cited

U.S. PATENT DOCUMENTS

| | | | |
|---|---|---|---|
| 5,933,818 A | 8/1999 | Kasravi |
| 5,940,367 A | 8/1999 | Antonov |
| 5,991,894 A | 11/1999 | Lee |
| 5,999,712 A | 12/1999 | Moiin |
| 6,078,930 A | 6/2000 | Lee |
| 6,453,426 B1 | 9/2002 | Gamache |
| 6,487,622 B1 | 11/2002 | Coskrey |
| 6,553,389 B1 | 4/2003 | Golding |
| 6,605,120 B1 | 8/2003 | Fields |
| 6,693,874 B1 | 2/2004 | Shaffer |
| 6,871,222 B1 | 3/2005 | Frank |
| 6,952,758 B2 | 10/2005 | Chron |
| 7,020,695 B1 | 3/2006 | Kundu |
| 7,139,925 B2 | 11/2006 | Dinker |
| 7,260,698 B2 | 8/2007 | Hepkin |
| 7,376,953 B2 | 5/2008 | Togasaki |
| 7,451,359 B1 | 11/2008 | Coekaerts |
| 7,464,378 B1 | 12/2008 | Lmaye |
| 7,543,046 B1 | 6/2009 | Bae |
| 7,613,774 B1 | 11/2009 | Caronni |
| 7,640,339 B1 | 12/2009 | Caronni |
| 7,676,628 B1 | 3/2010 | Compton |
| 7,698,390 B1 | 4/2010 | Harkness |
| 7,720,971 B2 | 5/2010 | Moutafov |
| 7,739,677 B1 | 9/2010 | Kekre |
| 7,792,977 B1 | 9/2010 | Brower |
| 7,814,248 B2 | 10/2010 | Fong |
| 7,882,067 B2 | 2/2011 | Saika |
| 7,953,861 B2 | 5/2011 | Yardley |
| 7,975,288 B2 | 7/2011 | Viavant |
| 7,979,457 B1 | 7/2011 | Garman |
| 8,209,307 B2 | 6/2012 | Erofeev |
| 8,312,439 B2 | 11/2012 | Kielstra |
| 8,397,227 B2 | 3/2013 | Fan |
| 8,402,464 B2 | 3/2013 | Dice |
| 8,595,714 B1 | 11/2013 | Hamer |
| 8,930,581 B2 | 1/2015 | Anton |
| 9,135,268 B2 | 9/2015 | Dash |
| 9,609,060 B2 | 3/2017 | Kan |
| 2002/0035559 A1 | 3/2002 | Crowe |
| 2002/0042693 A1 | 4/2002 | Kampe |
| 2002/0078312 A1 | 6/2002 | Wang-Knop |
| 2003/0120715 A1 | 6/2003 | Johnson |
| 2003/0135476 A1 | 7/2003 | Holland |
| 2003/0187927 A1 | 10/2003 | Winchell |
| 2004/0059805 A1 | 3/2004 | Dinker |
| 2004/0153558 A1 | 8/2004 | Gunduc |
| 2004/0153615 A1 | 8/2004 | Koning |
| 2004/0176968 A1 | 9/2004 | Syed |
| 2004/0179471 A1 | 9/2004 | Mekkittikul |
| 2004/0205148 A1 | 10/2004 | Bae |
| 2004/0215640 A1 | 10/2004 | Bamford |
| 2004/0267897 A1 | 12/2004 | Hill |
| 2005/0021690 A1 | 1/2005 | Peddada |
| 2005/0021737 A1 | 1/2005 | Ellison |
| 2005/0028139 A1 | 2/2005 | Togahara |
| 2005/0083834 A1 | 4/2005 | Dunagan |
| 2005/0160315 A1 | 7/2005 | Chandrasekaran |
| 2005/0193392 A1 | 9/2005 | Carusi |
| 2005/0257217 A1 | 11/2005 | Woollen |
| 2006/0048020 A1 | 3/2006 | Newport |
| 2007/0016822 A1 | 1/2007 | Rao |
| 2007/0118693 A1 | 5/2007 | Brannon |
| 2007/0124348 A1 | 5/2007 | Claborn |
| 2007/0140110 A1 | 6/2007 | Kaler |
| 2007/0174160 A1 | 7/2007 | Solberg |
| 2007/0198700 A1 | 8/2007 | Vivian |
| 2007/0237072 A1 | 10/2007 | Scholl |
| 2007/0271584 A1 | 11/2007 | Anderson |
| 2008/0077622 A1 | 3/2008 | Keith |
| 2008/0133531 A1 | 6/2008 | Baskerville |
| 2008/0141336 A1 | 6/2008 | Haller |
| 2008/0183876 A1 | 7/2008 | Duvur |
| 2008/0184201 A1 | 7/2008 | Burns |
| 2008/0276231 A1 | 11/2008 | Huang |
| 2008/0281959 A1 | 11/2008 | Robertson |
| 2008/0313293 A1 | 12/2008 | Jacobs |
| 2009/0144714 A1 | 6/2009 | Fan |
| 2009/0177914 A1 | 7/2009 | Winchell |
| 2009/0228321 A1 | 9/2009 | Srinivasan |
| 2009/0265449 A1 | 10/2009 | Krishnappa |
| 2009/0320005 A1 | 12/2009 | Toub |
| 2010/0064341 A1 | 3/2010 | Aldera |
| 2010/0128732 A1 | 5/2010 | Jiang |
| 2010/0174802 A1 | 7/2010 | Chan |
| 2010/0250321 A1 | 9/2010 | Farrell |
| 2010/0268571 A1 | 10/2010 | Davies |
| 2010/0268749 A1 | 10/2010 | Seitz |
| 2010/0312861 A1 | 12/2010 | Kolhi |
| 2011/0041006 A1 | 2/2011 | Fowler |
| 2011/0071981 A1 | 3/2011 | Ghosh |
| 2011/0072217 A1 | 3/2011 | Hoang |
| 2011/0107135 A1 | 5/2011 | Andrews |
| 2011/0131663 A1 | 6/2011 | Kaikuranta |
| 2011/0161289 A1 | 6/2011 | Pei |
| 2011/0179231 A1 | 7/2011 | Roush |
| 2011/0249552 A1 | 10/2011 | Stokes |
| 2011/0252192 A1 | 10/2011 | Busch |
| 2012/0117157 A1 | 5/2012 | Ristock |
| 2012/0158650 A1 | 6/2012 | Andre |
| 2012/0191642 A1 | 7/2012 | George |
| 2012/0198455 A1 | 8/2012 | Lee |
| 2012/0215740 A1 | 8/2012 | Vaillant |
| 2012/0254118 A1 | 10/2012 | Shah |
| 2012/0297056 A1 | 11/2012 | Lee |
| 2013/0047165 A1 | 2/2013 | Goetz |
| 2014/0149698 A1 | 5/2014 | Ezra |
| 2015/0058293 A1 | 2/2015 | Kobayashi |

OTHER PUBLICATIONS

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=1066&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

(56) References Cited

OTHER PUBLICATIONS

Oracle®, Oracle® Database, JDBC Developer's Guide 12c Release 1 (12.1), Jun. 2014, Copyright© 1999, 2014, 520 pages.

SYSTEM AND METHOD FOR SUPPORTING PERSISTENT STORE VERSIONING AND INTEGRITY IN A DISTRIBUTED DATA GRID

CLAIM OF PRIORITY

This application is a continuation of U.S. patent application Ser. No. 14/271,150, entitled "SYSTEM AND METHOD FOR SUPPORTING PERSISTENT STORE VERSIONING AND INTEGRITY IN A DISTRIBUTED DATA GRID" filed May 6, 2014, which claims priority to U.S. Provisional Patent Application No. 61/915,912, entitled "SYSTEM AND METHOD FOR SUPPORTING PERSISTENCE IN A DISTRIBUTED DATA GRID" filed Dec. 13, 2013, which applications are herein incorporated by reference.

CROSS REFERENCE TO RELATED APPLICATIONS

This application is related to the following patent application(s), each of which is hereby incorporated by reference in its entirety:

U.S. patent application titled "SYSTEM AND METHOD FOR SUPPORTING SERVICE LEVEL QUORUM IN A DATA GRID CLUSTER", application Ser. No. 13/352,203, filed on Jan. 17, 2012;

U.S. patent application titled "SYSTEM AND METHOD FOR SUPPORTING PERSISTENCE PARTITION DISCOVERY IN A DISTRIBUTED DATA GRID", application Ser. No. 14/271,142, filed May 6, 2014; and U.S. patent application titled "SYSTEM AND METHOD FOR SUPPORTING PERSISTENT SNAPSHOT OF A RUNNING SYSTEM IN A DISTRIBUTED DATA GRID", application Ser. No. 14/271,161, May 6, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting persistence in a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand. This is the general area that embodiments of the invention are intended to address.

SUMMARY

Described herein are systems and methods that can support persistence in a distributed data grid, such as persistent store versioning and integrity. A resolver in the distributed data grid can receive a plurality of identifiers from one or more members of the distributed data grid, wherein each said identifier is associated with a persisted partition in a persistent storage for the distributed data grid. Then, the resolver can select an identifier for each partition, wherein each selected identifier is associated with a most recent valid version of a partition. Furthermore, the resolver can determine a member in the distributed data grid that is responsible for recovering said partition from a persisted partition associated with the selected identifier.

DETAILED DESCRIPTION

Figure 1:
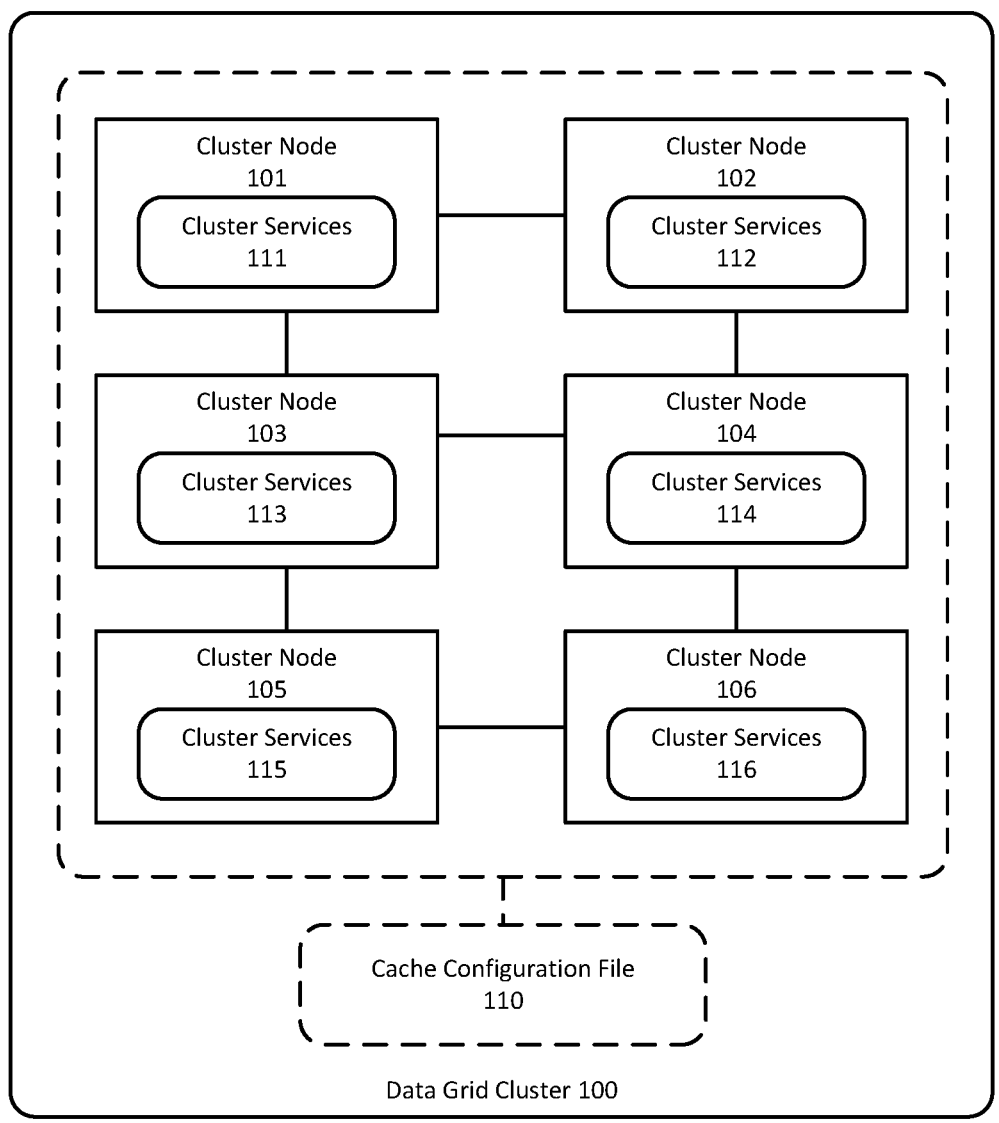
FIG. 1 is an illustration of a data grid cluster in accordance with various embodiments of the invention.

Described herein are systems and methods that can support persistence in a distributed data grid.

Distributed Data Grid

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster members (or server nodes) such as cluster nodes 101-106, having various cluster services 111-116 running thereon. Additionally, a cache configuration file 110 can be used to configure the data grid cluster 100.

Persistent Storage of Cache Contents

In accordance with an embodiment of the invention, the distributed data grid can provide recoverable persistent storage for different types of cache content and can prevent data loss after the distributed data grid is shut down.

Figure 2:
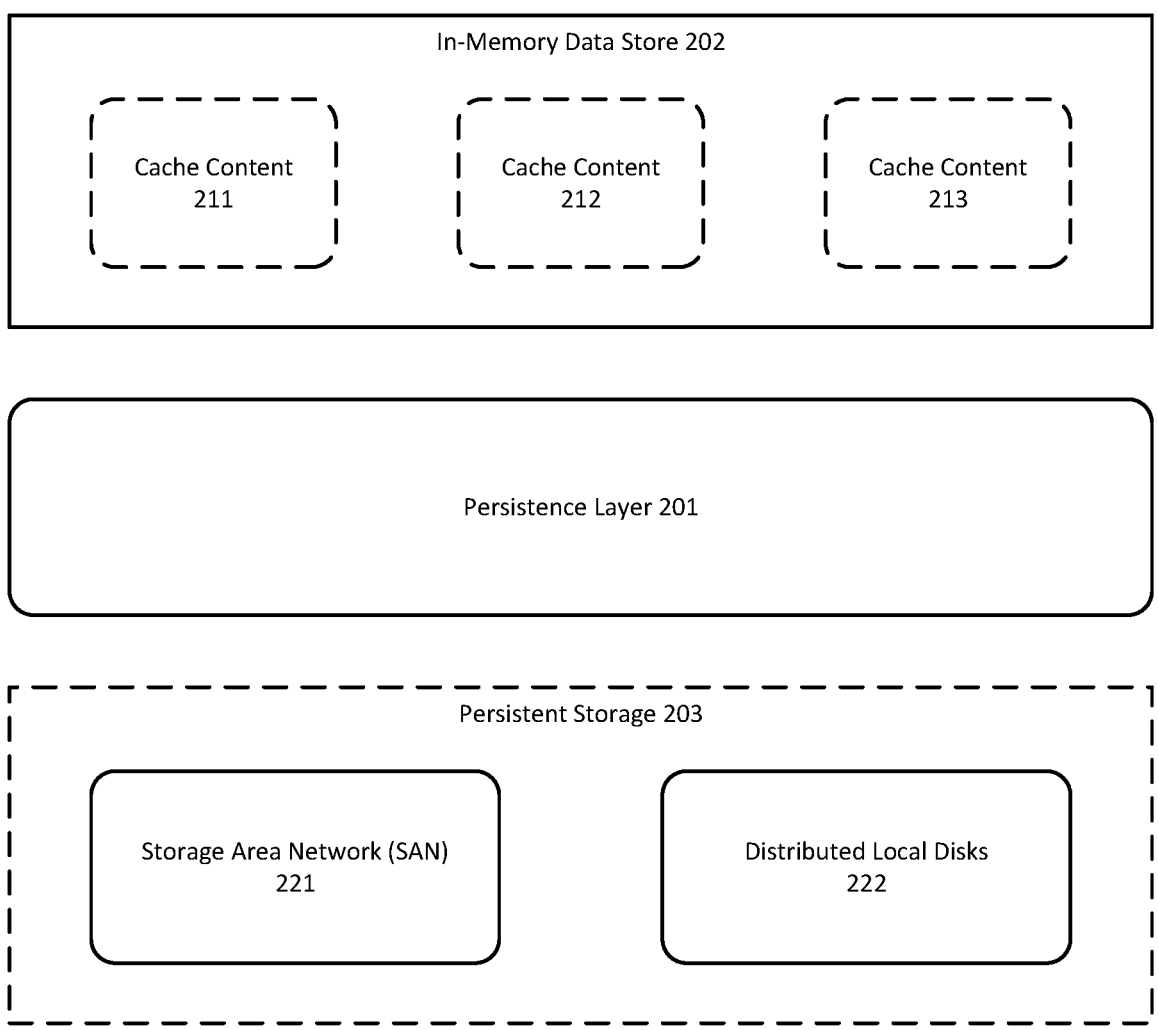
FIG. 2 shows an illustration of supporting persistence in a distributed data grid, in accordance with an embodiment of the invention.

FIG. 2 shows an illustration of supporting persistence in a distributed data grid, in accordance with an embodiment of the invention. As shown in FIG. 2, a distributed data grid 200 can include various types of cache content 211-213 in an in-memory data store 202. Furthermore, the distributed data grid 200 can use a persistence layer 201 to persist the cache content 211-213 in a persistent storage 203.

The persistence layer 201 allows the persistent storage 203 to use different physical topologies. For example, the persistence layer 201 can store the cache content in a central location, such as a storage area network (SAN) 221, where all members in the distributed data grid 200 can share the same visibility. Alternatively, the persistence layer 201 can store the cache content into different local disks 222, where members of the distributed data grid 200 may have only local visibility.

Furthermore, the persistence layer 201 can be agnostic to the choice of the physical topology (e.g. a SAN 221 or distributed local disks 222). For example, the distributed data grid 200 can take advantage of multiple SANs or multiple SAN mount points. Also, the distributed data grid 200 can take advantage of a physical topology that includes multiple SANs that are not shared by the plurality of members. Alternatively, the physical topology may include multiple SANs exporting storage locations, or may include hybrid deployments of local disks and SANs.

Additionally, the persistence layer 201 can support partition-wide atomicity of persisted data/metadata, and can provide transaction guarantee after a restart of the distributed data grid 200. Also, the persistence layer 201 can minimize performance impact and reduce recovery time needed to restart the distributed data grid 200.

Figure 3:
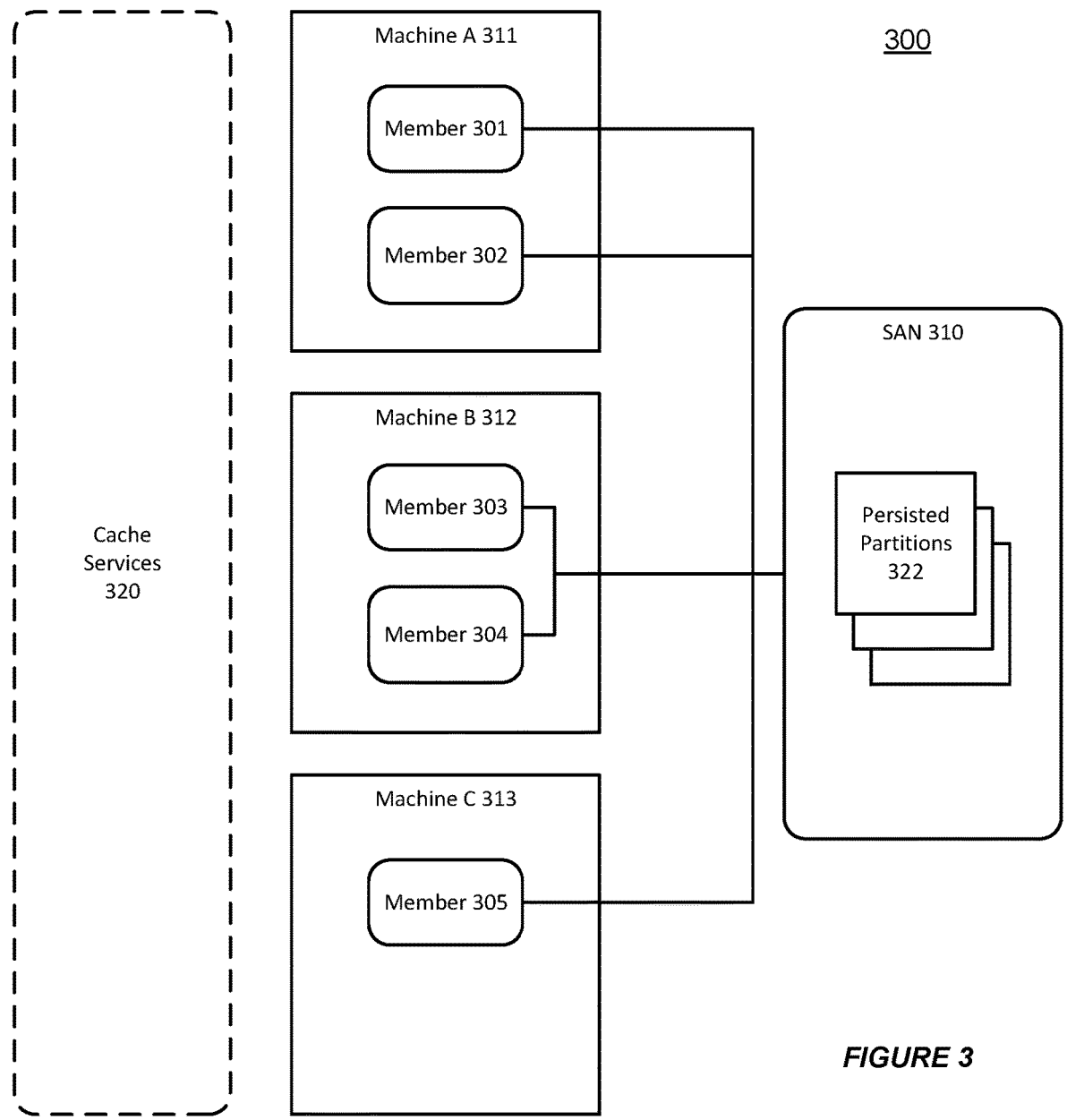
FIG. 3 shows an illustration of using a shared storage to support persistence in a distributed data grid, in accordance with an embodiment of the invention.

FIG. 3 shows an illustration of using a shared storage to support persistence in a distributed data grid, in accordance with an embodiment of the invention. As shown in FIG. 3, a distributed data grid 300, which includes a plurality of members (e.g. the members 301-305 on the machines A-C 311-313), can support various cache services 320.

Furthermore, the distributed data grid 300 can use a shared persistent storage, such as a storage area network (SAN) 310, to store the cache content for the cache services 320 in a central location. As shown in FIG. 3, the different members 301-305 on the machines A-C 311-313 can share the same visibility, and can all have access to the persisted partitions 322 in the SAN 310.

Thus, the system can recover the persisted cache content and prevent data loss, when the distributed data grid 300 is restarted after a shutdown.

Figure 4:
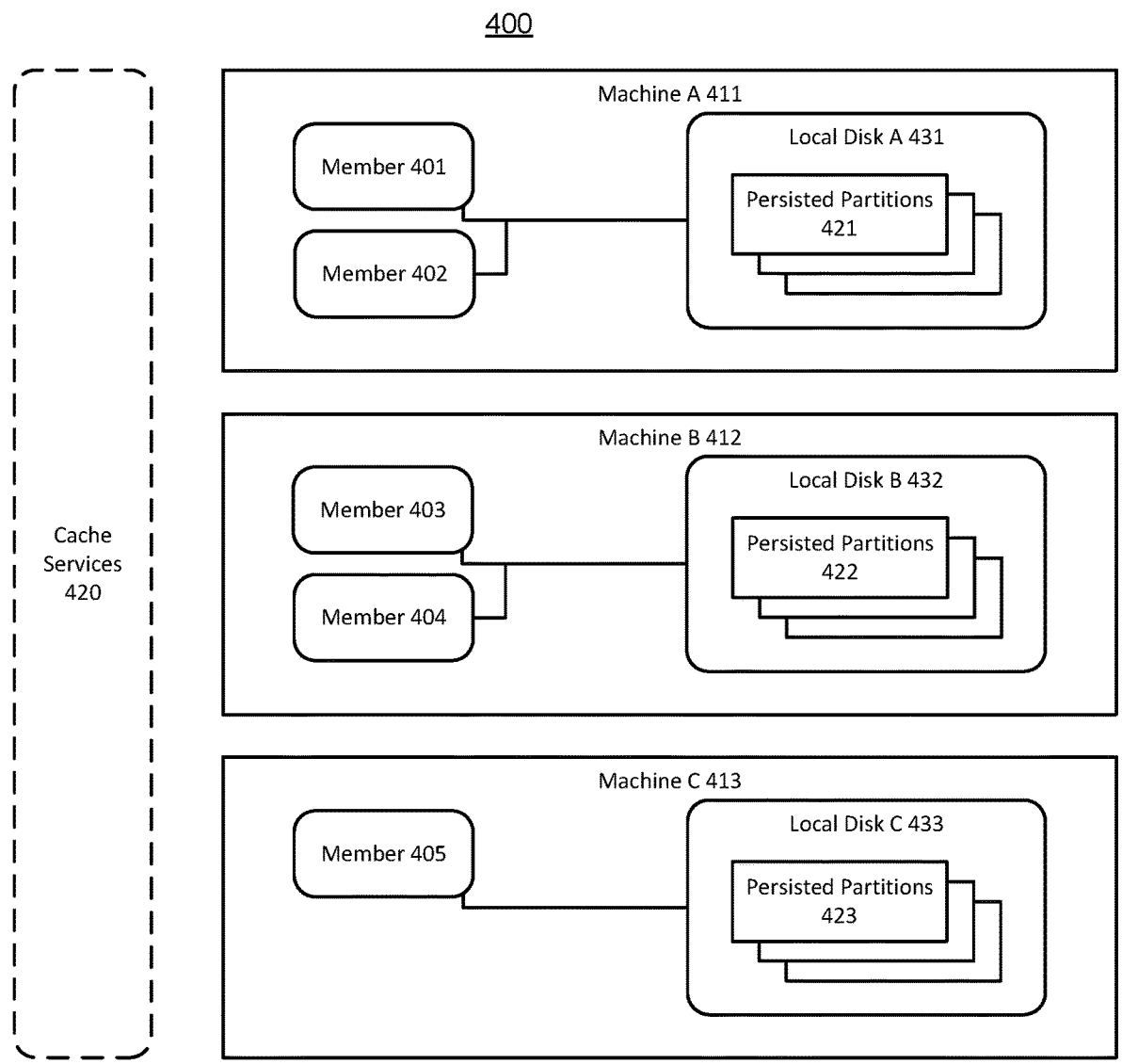
FIG. 4 shows an illustration of using distributed local disks to support persistence in a distributed data grid, in accordance with an embodiment of the invention.

FIG. 4 shows an illustration of using distributed local disks to support persistence in a distributed data grid, in accordance with an embodiment of the invention. As shown in FIG. 4, a distributed data grid 400, which includes a plurality of members (e.g. the members 401-405 on the machines A-C 411-413), can support various cache services 420.

Furthermore, the distributed data grid 400 can store the cache content for the cache services 420 into the local disks on different machines. For example, the members 401-402 can store the related cache content into the local disk A 431 on machine A 411 (e.g. the persisted partitions 421). Also, the members 403-404 can store the related cache content into the local disk B 432 on the machine B 412 (e.g. the persisted partitions 422), and the machine C 413 can store the related cache content into the local disk C 433 on the machine C 413 (e.g. the persisted partitions 423).

Thus, the distributed data grid 400 can support the automatic recovery of various types of cache content in a distributed fashion, and prevent data loss during the restart of the distributed data grid 400.

Distributed Persistent Store Recovery

In accordance with an embodiment of the invention, the distributed data grid can support persistent store recovery in a distributed fashion.

Figure 5:
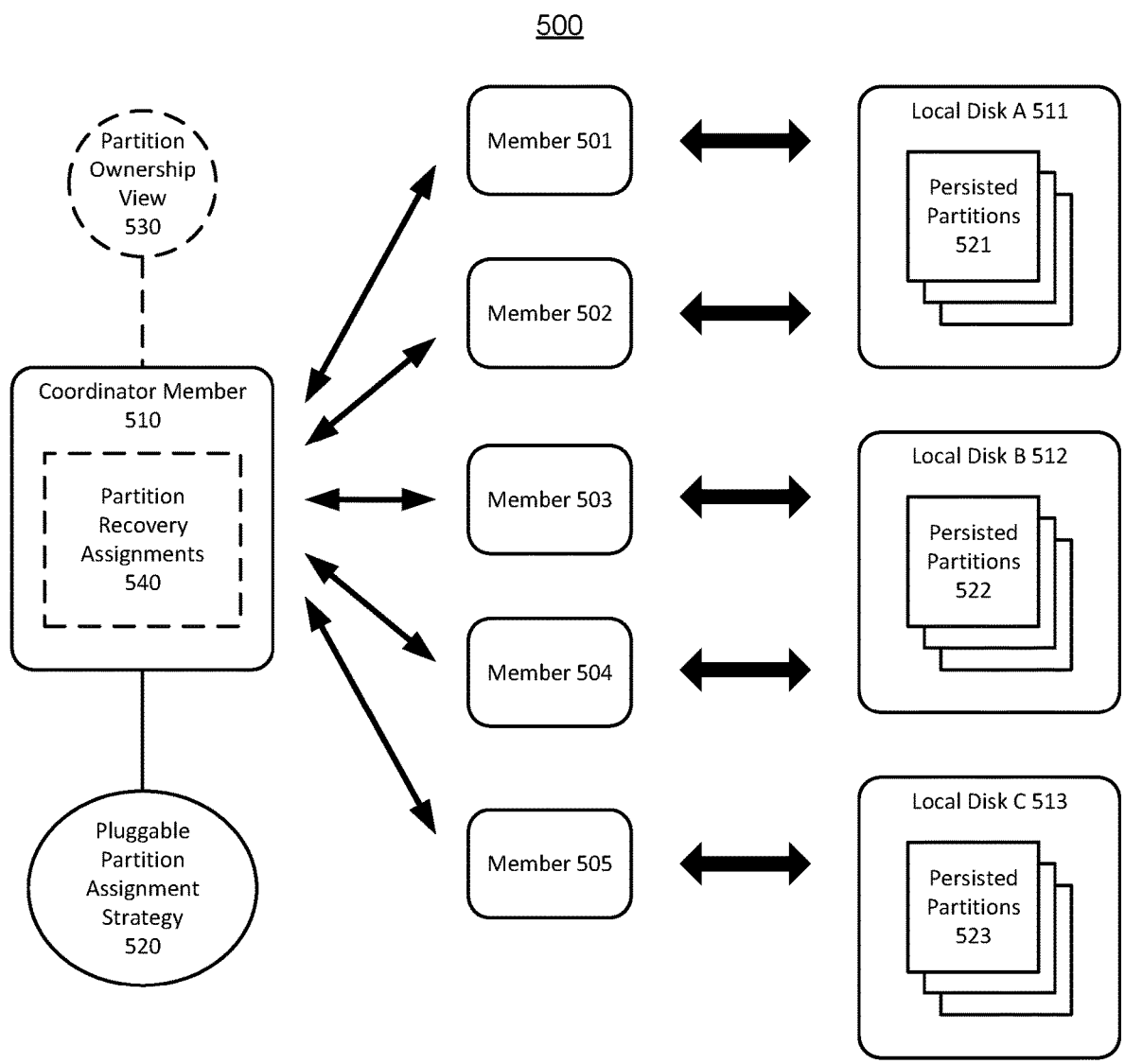
FIG. 5 shows an illustration of supporting distributed persistent store recovery in a distributed data grid, in accordance with an embodiment of the invention.

FIG. 5 shows an illustration of supporting distributed persistent store recovery in a distributed data grid, in accordance with an embodiment of the invention. As shown in FIG. 5, a distributed data grid 500 can include a plurality of members, e.g. members 501-505, and can persist the cache content using the distributed local disks, e.g. local disks A-C 511-513.

Furthermore, each member in the distributed data grid 500 may only have visibility to the partitions persisted in the local disk. For example, the member 501 and the member 502 may only be aware of the persisted partitions 521 in the local disk A 511, while the member 503 and the member 504 may only be aware of the persisted partitions 522 in the local disk B 512 and the member 505 may only be aware of the persisted partitions 523 in the local disk C 513.

In accordance with an embodiment of the invention, the distributed data grid 500 can use an internal protocol to discover the persisted partitions 521-523 on different local disks A-C 511-513. For example, the discovery protocol supports the persistent store recovery during both the cluster cold-start/restart scenario and the multiple-node failure scenario (e.g. with a loss of a primary owner of a partition and/or one or more backup owners of the partition).

As shown in FIG. 5, the distributed data grid 500 can use a coordinator member 510 to coordinate the recovery of various persisted partitions 521-523 in the distributed data grid 500. The coordinator member 510 can send a distributed query to other members 501-505 in the distributed data grid 500 in order to obtain a complete list of persisted partitions 521-523.

In accordance with an embodiment of the invention, the coordinator member 510 can use a pluggable partition assignment strategy component 520 to determine the partition recovery assignment 540. For example, the system can go down the list of the partitions to examine which member can see a version of the partition. Then, the system can determine which member should be used to recover which partition based on a synchronized partition ownership view 530.

Furthermore, the system can minimize the performance impact caused by adding persistence support to the distributed data grid 500. For example, the system can use an asynchronous messaging process in the distributed data grid 500 for implementing the write operation to a persistent store. Also, the system allows the performing of multiple input/output (I/O) operations concurrently.

Additionally, the coordinator member 510 can avoid using only one or a few members in the distributed data grid 500 for performing the recovery, which may be prone to create performance bottleneck.

Also, the system can use a recovery quorum to ensure that all persisted partitions are visible prior to the recovery in order to prevent data loss due to recovery.

Additional descriptions of various embodiments of supporting service level quorum in a distributed data grid 500 are provided in U.S. patent application titled "SYSTEM AND METHOD FOR SUPPORTING SERVICE LEVEL QUORUM IN A DATA GRID CLUSTER", application Ser. No. 13/352,203, filed on Jan. 17, 2012, which application is herein incorporated by reference.

Thus, the distributed data grid 500 can automatically carry out a recovery of persisted cache contents in a distributed fashion during a restart of the distributed data grid 500.

Figure 6:
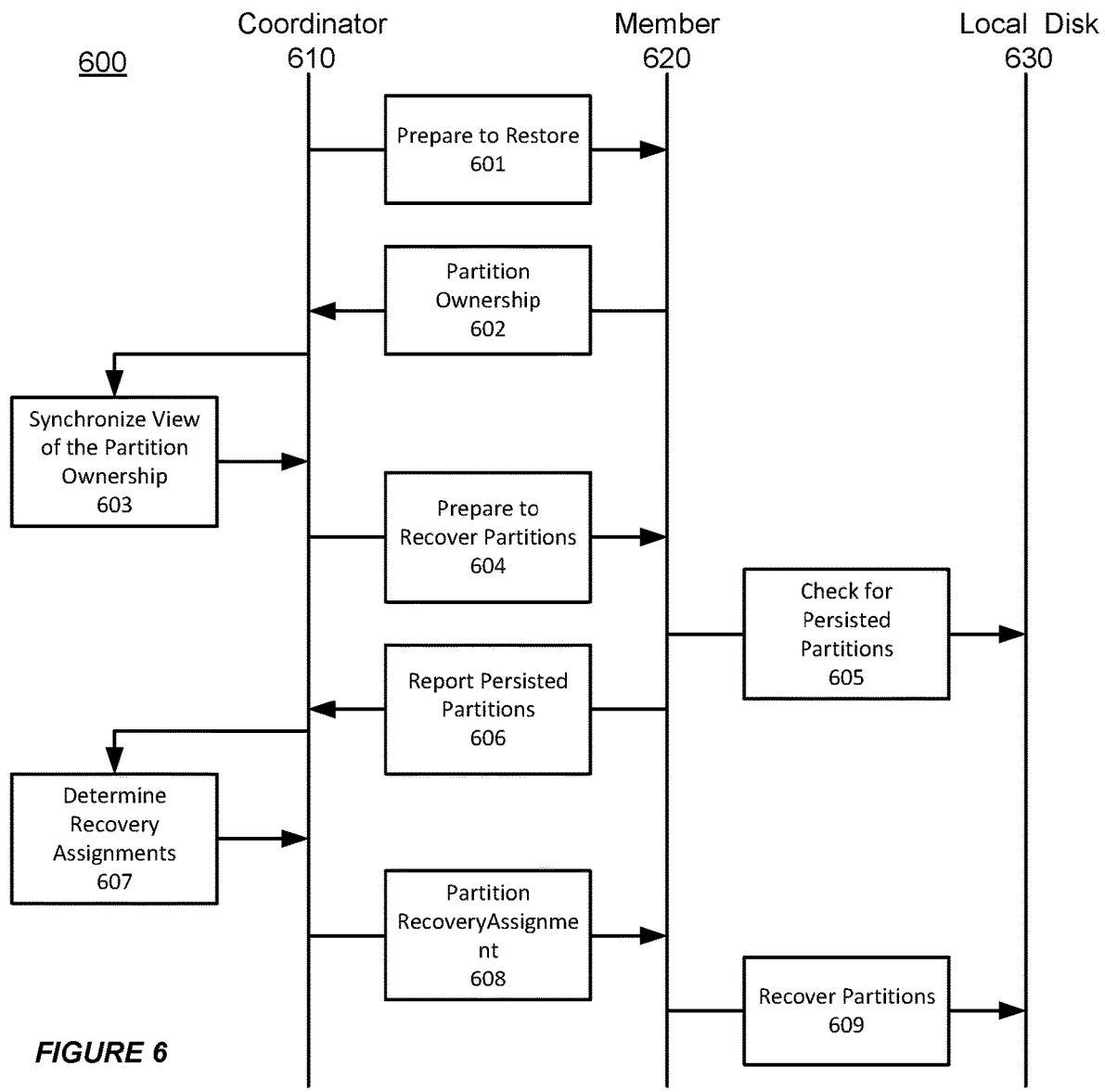
FIG. 6 shows an illustration of coordinating persistent store recovery in a distributed data grid, in accordance with an embodiment of the invention.

FIG. 6 shows an illustration of coordinating persistent store recovery in a distributed data grid, in accordance with an embodiment of the invention. As shown in FIG. 6, a coordinator member 610 in a distributed data grid 600 can coordinate the recovery of the persisted partitions from the distributed local disks. For example, the coordinator member 610 can direct a member 620 to recover persisted partitions from a local disk 630.

At step 601, the coordinator 610 can instruct the member 620 (and all other members in the distributed data grid 600 concurrently) to prepare for restoring persisted partitions. Then, at step 602, the member 620 (possibly along with each other member in the distributed data grid 600) can provide a local partition ownership back to the coordinator member 610.

At step 603, the coordinator member 610 can synchronize a view of the overall partition ownership, after obtaining the partition ownership information from the different members in the distributed data grid 600.

Furthermore, at step 604, the coordinator 610 can instruct the member 620 to prepare for recovering the persisted partitions based on the view of the overall partition ownership. At step 605, the member 620 can check for the persisted partitions in the local disk 630. Then, at step 606, the member 620 can report the persisted partitions (e.g. the persisted partition IDs) in the local disk 630 to the coordinator member 610.

At step 607, after obtaining information about the persisted partitions from the different members in the distributed data grid 600, the coordinator member 610 can make decision on how to configure a recovery process, such as determining a recovery assignment.

Then, at step 608, the coordinator 610 can provide the partition recovery assignment (e.g. the recover partition IDs) to each member in the distributed data grid 600. Finally, at step 609, the different members in the distributed data grid 600 (including the member 620) can carry out the recovery of the persisted partitions based on the received partition recovery assignment.

Figure 7:
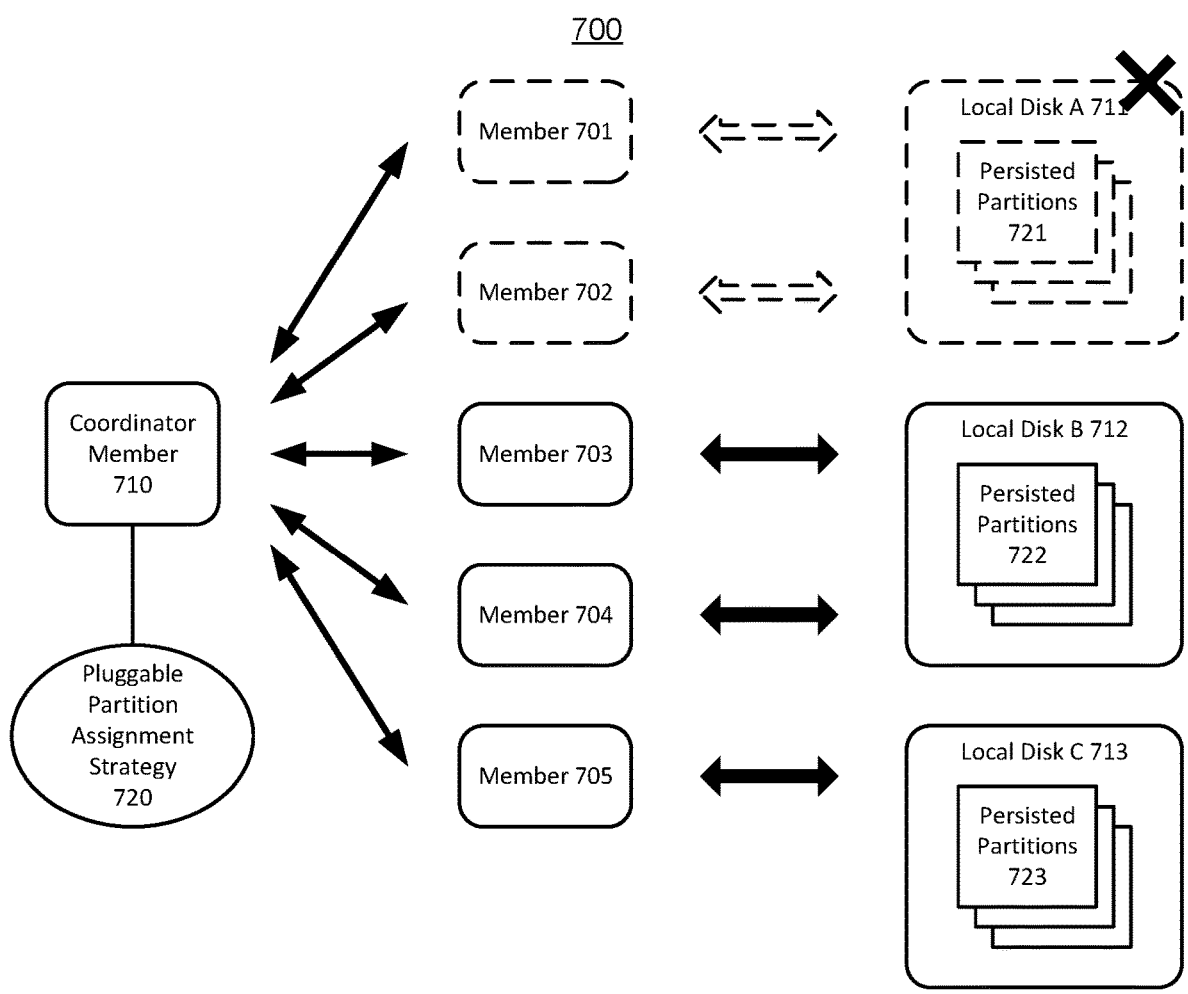
FIG. 7 shows an illustration of supporting consistent partition recovery in a distributed data grid, in accordance with an embodiment of the invention.

FIG. 7 shows an illustration of supporting consistent partition recovery in a distributed data grid, in accordance with an embodiment of the invention. As shown in FIG. 7, a distributed data grid 700 can include a plurality of members, e.g. members 701-705, each of which may only have visibility to the partitions persisted in the local disk.

Furthermore, a coordinator member 710 can coordinate the recovery of various persisted partitions 721-723 from the distributed local disks A-C 711-713. Also, the coordinator member 710 can use a pluggable partition assignment strategy component 720 to determine which member should be used to recover which partition.

In accordance with an embodiment of the invention, when a machine in the distributed data grid 700 is lost, the system can promote in-memory backups to in-memory primaries. As part of this process, the system can create a new persisted partition on disk and can also create one or more in-memory backups on other members from the data in memory.

Additionally, when in-memory data loss occurs due to two or more (depending on the backup count) member processes dying simultaneously, the system can recover a new in-memory primary from the persisted version on disk, when there is a member having visibility to the disk.

As shown in FIG. 7, when a machine that is associated with the local disk A 711 is lost, the persisted partitions 721 may become unavailable. In such a case, the distributed data grid 700 can rebalance itself. For example, the distributed data grid 700 can promote a back-up partition which is persisted in either the local disk B 712 or the local disk C 713 as the primary partition.

In accordance with an embodiment of the invention, the distributed data grid 700 can ensure that the system always restores the most recent valid partition. For example, the persisted partitions 722 in the local disk B 712 may contain a newer version of the partition, since the persisted partitions 721 in the local disk A 711 may not be updated correctly or an older version of the partition exists due to the death of the prior owner of the partition.

In accordance with an embodiment of the invention, the distributed data grid 700 can use a recovery quorum for supporting the discovery and/or the recovery of the persisted partitions 721-723. By using the recovery quorum, the recovery from persistence can be gated or protected. Thus, the distributed data grid 700 can ensure that no data is lost, even when the number of members that are lost exceeds the in-memory redundancy target.

Also, the distributed data grid 700 can ensure that all persisted partitions are visible prior to recovery. For example, the recovery quorum can be configured such that it guarantees visibility to all of the possible storage locations (such as local disks and/or SANs within the cluster). Additionally, the distributed data grid 700 can recover orphaned partitions from the persistent store and assign them as empty partitions Furthermore, the distributed data grid 700 can establish different recovery policies based on the recovery quorum. For example, the distributed data grid 700 can establish SAN/shared-storage policies that focus on capacity. Also, the distributed data grid 700 can establish distributed/shared-nothing storage policies that ensure all storage locations are reachable. Also, the distributed data grid 700 can establish various policies based on the configured membership size and the host-list.

In accordance with an embodiment of the invention, the system allows various members 701-705 in the distributed data grid 700 to be shut down (and/or restarted) in an orderly fashion, and allows for a graceful suspend/resume of an service or the entire cluster. Additionally, the system can prevent partition transfers and persistent store movements, during the shutdown of the distributed data grid. For example, a quiesced service/cluster may not join new members, may not restore partitions from backup, may not recover orphaned partitions from persistent store, may not assign empty orphaned partitions, and may not perform partition distribution.

Figure 8:
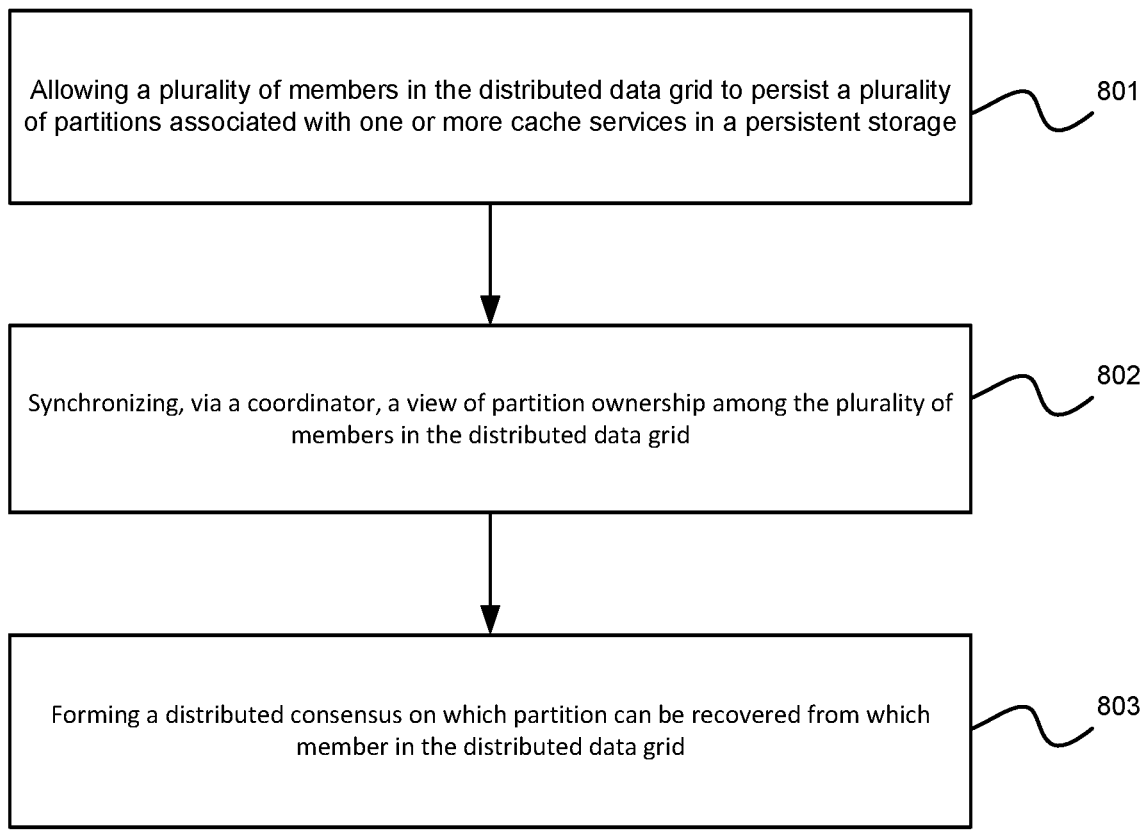
FIG. 8 illustrates an exemplary flow chart for supporting distributed persistent store recovery in a distributed data grid in accordance with an embodiment of the invention.

FIG. 8 illustrates an exemplary flow chart for supporting distributed persistent store recovery in a distributed data grid in accordance with an embodiment of the invention. As shown in FIG. 8, at step 801, the system allowing a plurality of members in the distributed data grid to persist a plurality of partitions associated with one or more cache services in a persistent storage. Then, at step 802, a coordinator can synchronize a view of partition ownership among the plurality of members in the distributed data grid. Furthermore, at step 803, the distributed data grid can form a distributed consensus on which partition can be recovered from which member in the distributed data grid.

Persistent Store Versioning and Integrity

Figure 9:
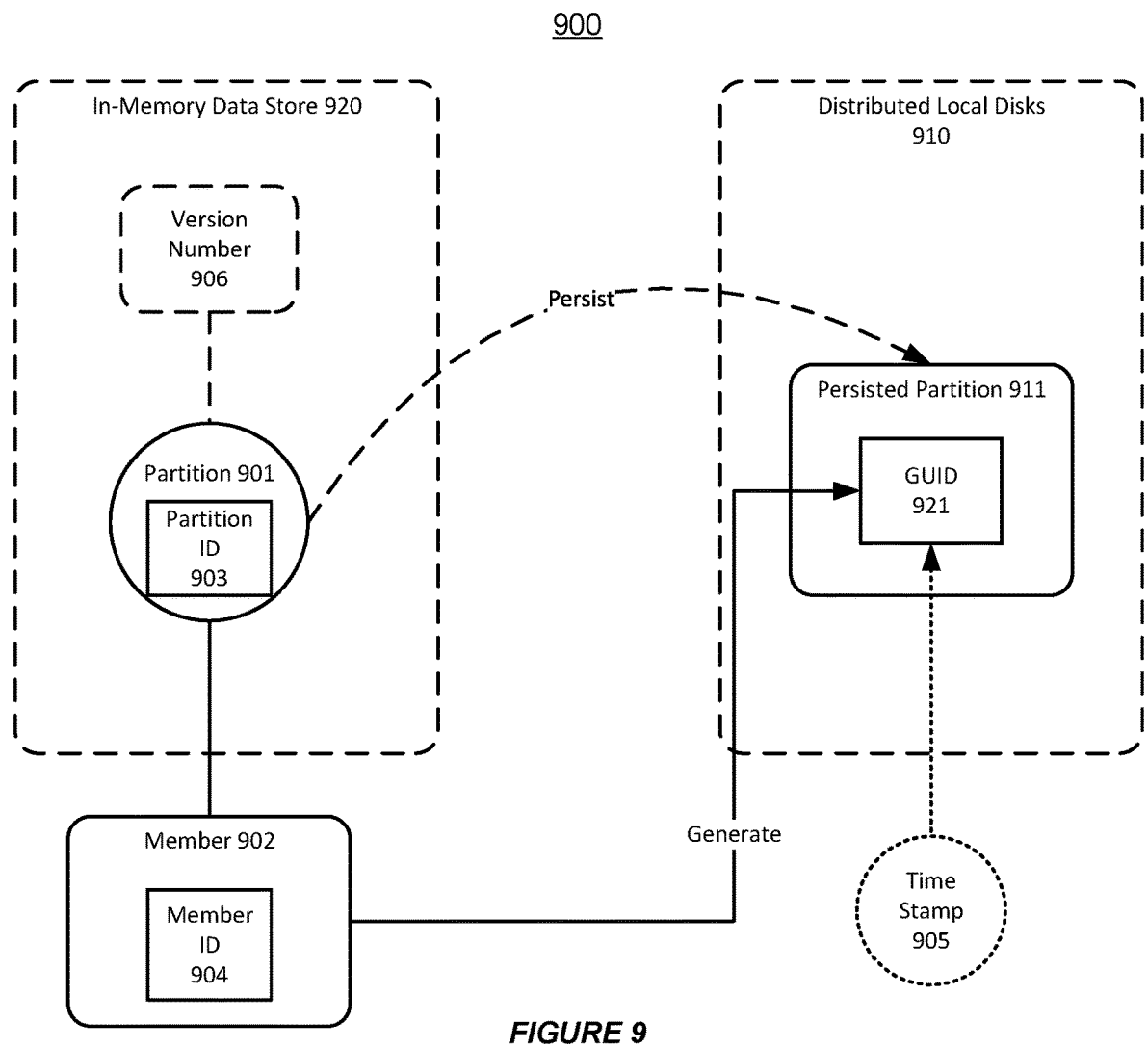
FIG. 9 shows an illustration of supporting persistent store versioning in a distributed data grid, in accordance with an embodiment of the invention.

FIG. 9 shows an illustration of supporting persistent store versioning in a distributed data grid, in accordance with an embodiment of the invention. As shown in FIG. 9, a distributed data grid 900 can use various partitions (e.g. a partition 901) in an in-memory data store 920 to support different cache services.

Furthermore, the distributed data grid 900 can use a persistent store (e.g. a persisted partition 911) to persist the partition 901 in the distributed local disks 910.

The system can provide a unique identifier (ID), or a unique version number 906, for each persisted partition in the distributed local disks 910. As shown in FIG. 9, a member 902 in the distributed data grid 900 can generate a globally unique identifier (GUID) 921 for the persistent partition 911. The GUID 921 can contain various types of information using a special naming format.

For example, the GUID 921 can include at least a partition number (or a partition ID 903) and a partition version number 911 associated with the partition 901. Additionally, the GUID 921 can contain a member ID 904, which indicates that the member 902 generates the GUID 921.

Additionally, the GUID 921 can include other information, such as a time stamp 905 that indicates the time when the partition 901 is first persisted. The time stamp 905 is a stamp of logical time (e.g. a stamp of a vector clock per partition), instead of a global wall clock. Thus, the system can guarantee that the GUID stamps move monotonically forward in the face of any kind of failure or transfer scenario.

In accordance with an embodiment of the invention, the distributed data grid 900 can maintain the version number 910 for each persisted partition in a monotonically increasing order. Thus, the system can account for the data mutation at any member or ownership changes in the distributed data grid 900.

Figure 10:
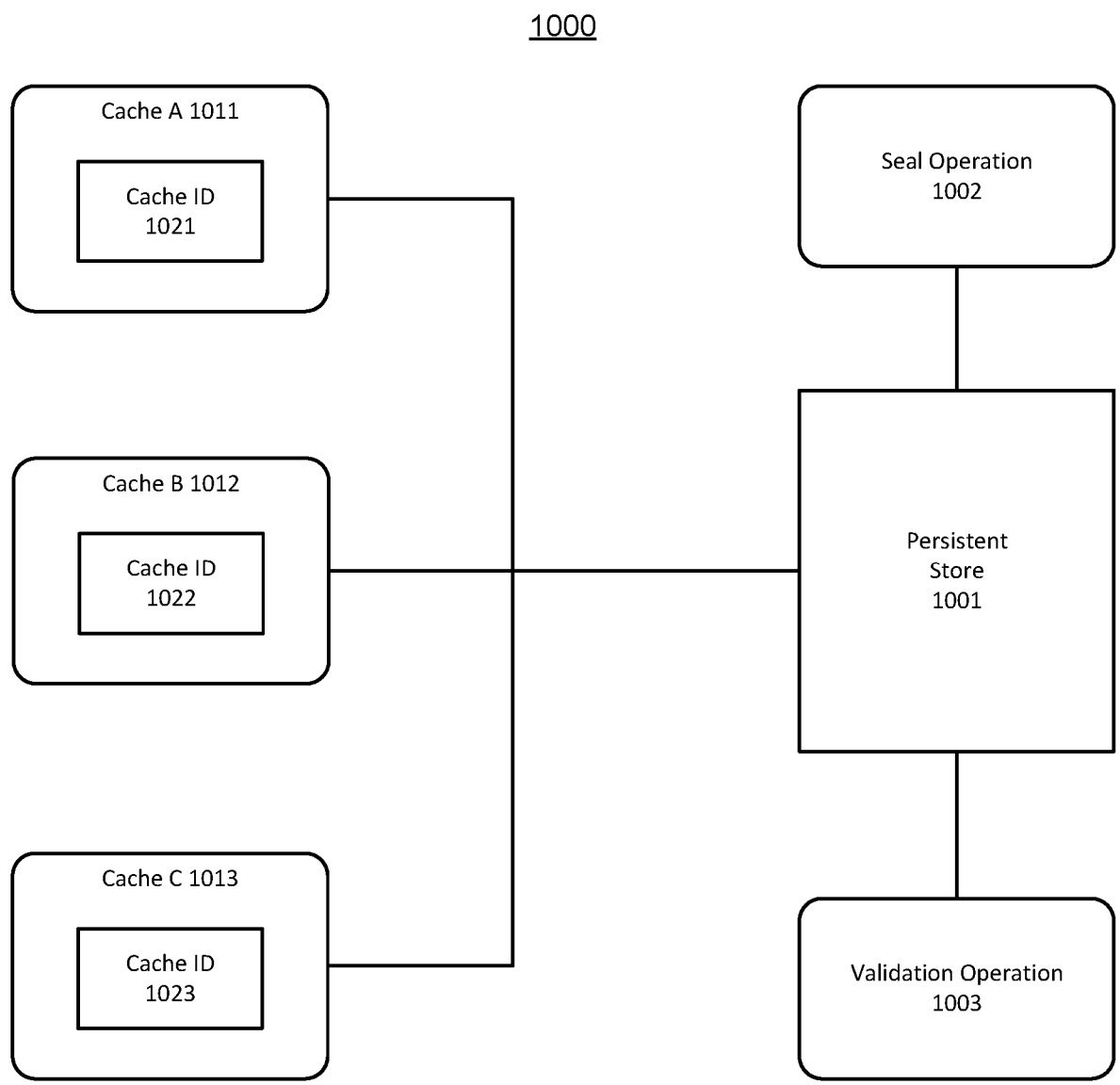
FIG. 10 shows an illustration of supporting persistent store integrity in a distributed data grid, in accordance with an embodiment of the invention.

FIG. 10 shows an illustration of supporting persistent store integrity in a distributed data grid, in accordance with an embodiment of the invention. As shown in FIG. 10, a persistent store 1001 in a distributed data grid 1000 can contain cache content from different caches A-C 1011-1013, each of which is associated with a cache ID 1021-1123.

Furthermore, the system can apply a seal operation 1002 on the persistent store 1001. The seal operation 1002 can ensure that the persistent store 1001 is fully initialized and is eligible to be recovered.

Additionally, the system can apply a validation operation 1003 on the persistent store 1001. The validation operation 1003 can check whether the persistent store 1001 has been sealed. For example, the system may decide that the cache content in the persistent store 1001 is not valid if the persistent store 1001 is not sealed.

Thus, the system can ensure that the distributed data grid 1000 always restores a valid persisted partition and avoids recovering a partial copy that may be caused by cascading cluster failures.

Figure 11:
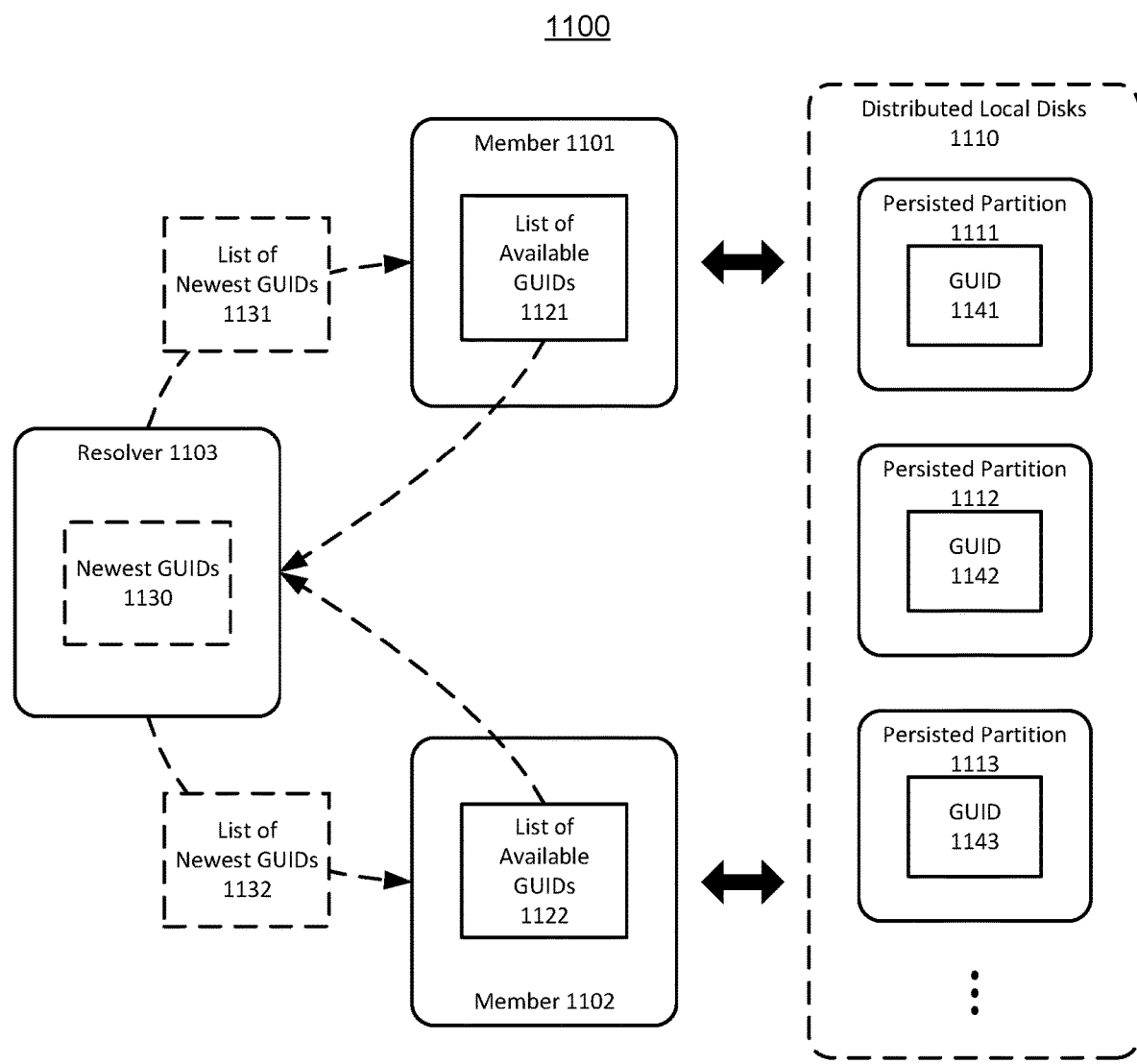
FIG. 11 shows an illustration of restoring the persisted partitions in a distributed data grid, in accordance with an embodiment of the invention.

FIG. 11 shows an illustration of restoring the persisted partitions in a distributed data grid, in accordance with an embodiment of the invention. As shown in FIG. 11, a distributed data grid 1100 can store various persisted partitions 1111-1113 in distributed local disks 1110.

Each persisted partition 1111-1113 stored in the distributed local disks 1110 can be associated with a globally unique identifier (GUID), e.g. GUID 1141-1143. The GUIDs 1141-1143 can contain different types of information that includes at least a partition number (i.e. a partition-id) and a version number.

In accordance with an embodiment of the invention, the members 1101-1102 in the distributed data grid 1100 may have different visibility to the persisted partitions 1011-1013 in the distributed local disks 1110. The system can configure the GUIDs 1141-1143 to contain information on which member may have visibility to a particular persisted partition 1111-1113.

Additionally, as a result of a cascading failure in the distributed local disks 1110, multiple versions of the same persisted partitions 1011-1013 may present on the different members 1101-1102 of the distributed data grid 1100. In order to disambiguate these different versions, each of the members 1101-1102 in the distributed data grid 1100 can report the GUI Ds 1141-1143 (which can include the partition numbers and other information) for each of the persisted partitions that are found. In accordance with an embodiment of the invention, only members reporting the presence of the most recent GUID for a partition can be considered for recovery.

As shown in FIG. 11, each member 1101-1102 in the distributed data grid 1100 can collect a list of available GUIDs 1121-1122 from the distributed local disks 1110 based on local visibility. Then, each member 1101-1102 can provide (or register) the list of available GUIDs 1121-1122 to a resolver 1103 in the distributed data grid 1100, and the resolver 1103 can determine the newest GUIDs 1130 for different partitions based on the partition number and version number information encoded in the GUI Ds 1141-1143.

Furthermore, due to the distributed nature of the system, the distributed local disks 1110 may contain multiple different versions of the same partition. In other words, the resolver 1103 may receive multiple GUIDs that contain the same partition number and different version numbers.

In such a case, the resolver 1103 can obtain the version number from each GUID associated with the same partition, and determine which GUID has the most recent version number. Also, the distributed data grid 1100 can ensure that the persisted partition with the most recent version number is valid based on performing the seal operation and validation operation.

Additionally, the resolver 1103 can determine which member 1101-1102 in the distributed data grid 1100 is responsible for recovering a particular persisted partition 1111-1113, based on the member ID information encoded in the GUI Ds 1141-1143.

Then, the resolver 1103 can provide the partition recovery assignment, which may include a list of the newest GUI Ds 1131-1132, to each different member 1101-1102. Accordingly, the members 1101-1102 can carry out the actual operation that restores the persisted partitions 1111-1113.

Thus, the system can ensure that the distributed data grid 1100 always restores the newest valid version of any persisted partition, and can avoid recovering a partial copy that may be caused by cascading cluster failures.

Figure 12:
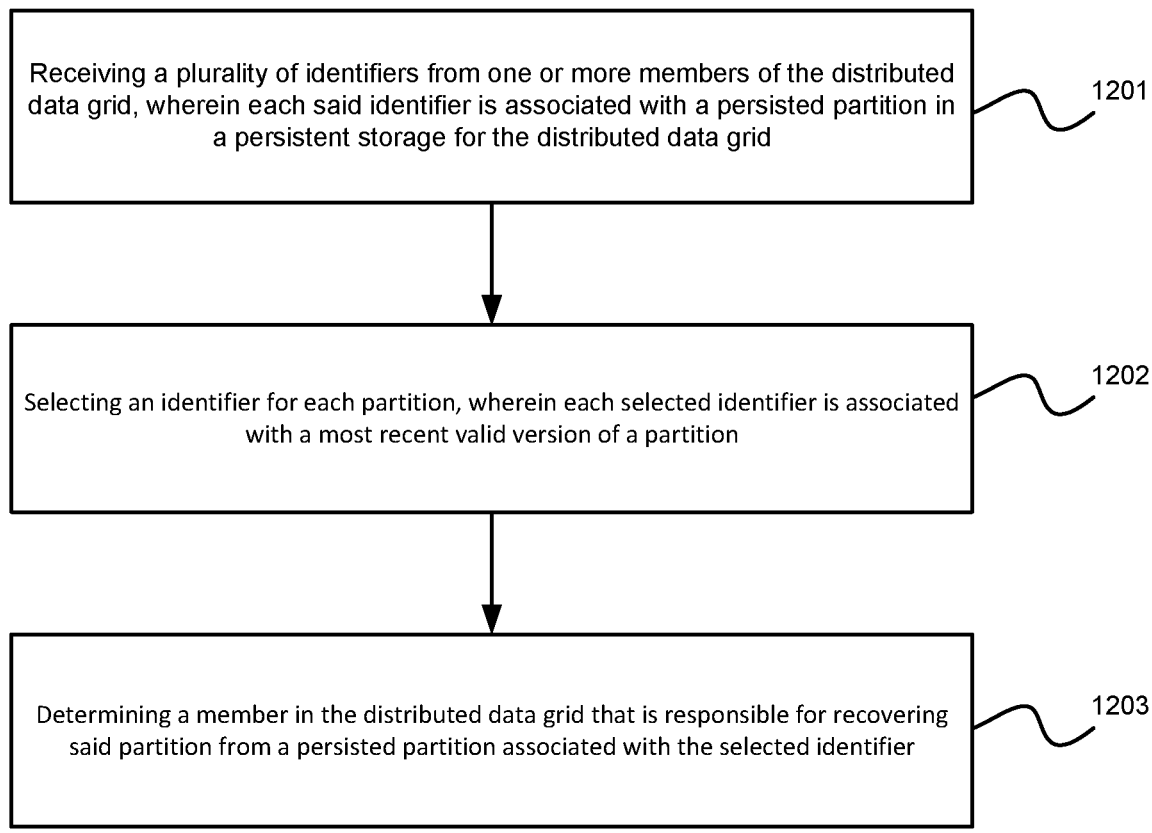
FIG. 12 illustrates an exemplary flow chart for supporting persistent store versioning and integrity and in a distributed data grid, in accordance with an embodiment of the invention.

FIG. 12 illustrates an exemplary flow chart for supporting persistent store versioning and integrity and in a distributed data grid, in accordance with an embodiment of the invention. As shown in FIG. 12, at step 1201, the system can receive a plurality of identifiers (e.g. the GUIDs) from one or more members of the distributed data grid, wherein each said identifier is associated with a persisted partition in a persistent storage for the distributed data grid. Then, at step 1202, the system can select an identifier for each partition, wherein each selected identifier is associated with a most recent valid version of a partition. Furthermore, at step 1203, the system can determine a member in the distributed data grid that is responsible for recovering said partition from a persisted partition associated with the selected identifier.

Persistent Snapshot of a Running System

Figure 13:
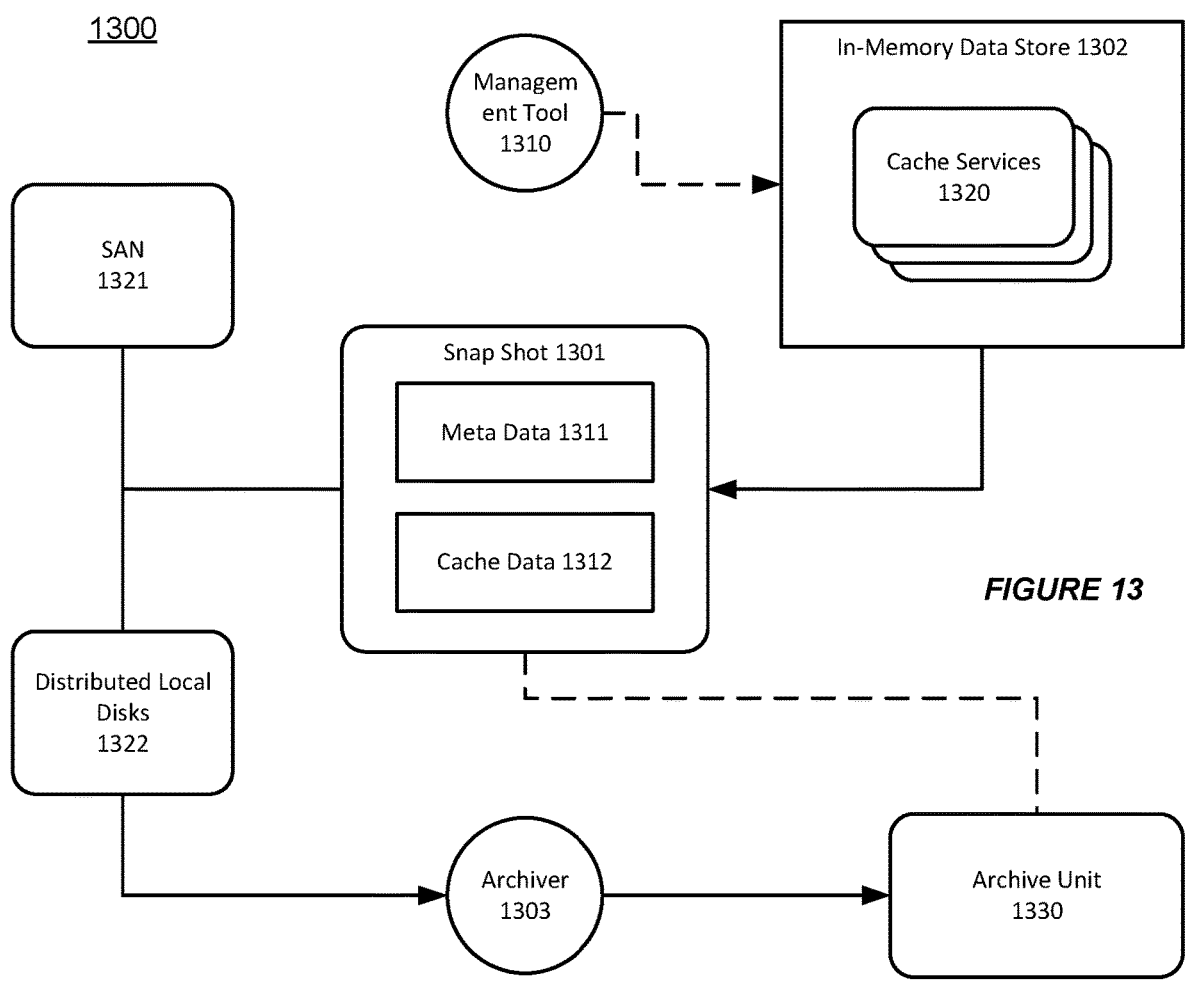
FIG. 13 shows an illustration of providing a persistent snapshot of a running system in a distributed data grid, in accordance with an embodiment of the invention.

FIG. 13 shows an illustration of providing a persistent snapshot of a running system in a distributed data grid, in accordance with an embodiment of the invention. As shown in FIG. 13, a distributed data grid 1300 can support various cache services 1320 using an in-memory data store 1302.

Furthermore, the system allows a user to use a management tool 1310 to take a snapshot 1301 of the running system on the in-memory data store 1302 that supports the cache services 1320 on-demand, at any particular time. For example, the snapshot 1301 can be used to make a backup of the running system overnight.

In accordance with an embodiment of the invention, the system can suspend the cache services 1320, prior to taking the snapshot 1301. Thus, the system can provide a consistent point in time for taking the snapshot 1301. Then, the cache service 1320 can be resumed after the snapshot 1301 is taken.

Additionally, the snapshot 1301 can provide a consistent view of each partitioned cache service 1320. For example, the snapshot 1301 can provide a catalogue of state information of the running system, including metadata 1311 and cache data 1312 for the partitioned cache services 1320. Additionally, the system can store the snapshot 1301 either in a central location (e.g. a SAN 1321) or in distributed local disks 1322.

Furthermore, when various artifacts in a snapshot 1301 are created and stored in the distributed local disks 1322, the system can use a pluggable (or portable) archiver 1303 to retrieve the persisted state information of the snapshot 1301 from the distributed local disks 1322, and can create a single archive unit 1330, which can be used for auditing or other purposes.

Thus, the system allows a user to take a snapshot on the state of a partitioned cache service in a distributed data grid 1300, instead of persisting the cache content in the distributed data grid 1300 in a continuing fashion.

Figure 14:
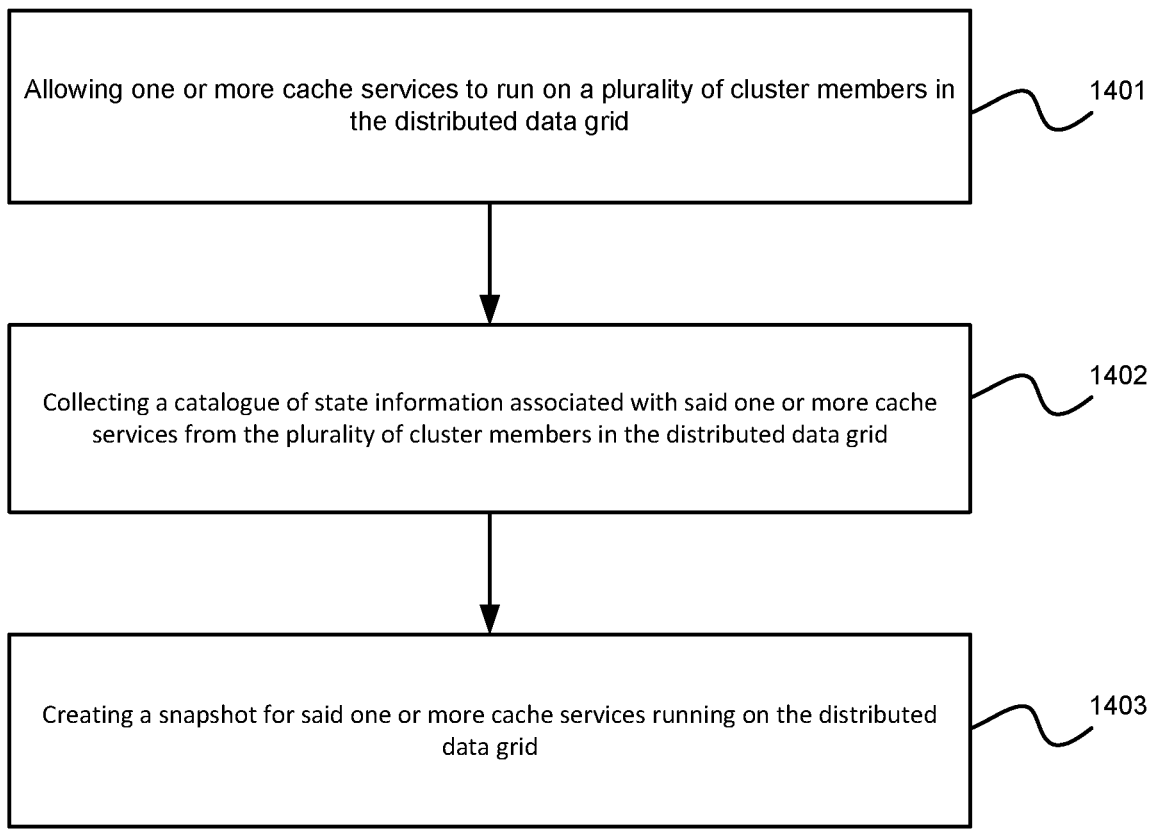
FIG. 14 illustrates an exemplary flow chart for providing a persistent snapshot of a running system in a distributed data grid in accordance with an embodiment of the invention.

FIG. 14 illustrates an exemplary flow chart for providing a persistent snapshot of a running system in a distributed data grid in accordance with an embodiment of the invention. As shown in FIG. 14, at step 1401, the system allows one or more cache services to run on a plurality of cluster members in the distributed data grid. Then, at step 1402, the system can collect a catalogue of state information associated with said one or more cache services from the plurality of cluster members in the distributed data grid. Furthermore, at step 1403, the system can create a snapshot for said one or more cache services running on the distributed data grid The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for recovering of persisted data from persistent storage in a distributed data grid comprising a plurality of members, wherein each of the plurality of members manages partitioned cache content held in the random access memory of a computer on which each member of the plurality of members respectively executes, the method comprising:
   accessing the persisted data by each active member of the plurality of members wherein the persisted data comprises a plurality of persisted partitions persisted by each member of the plurality of members, the plurality of persisted partitions each identified by a globally unique identifier (GUID) for each member's respective persisted partition, wherein each GUID for each respective persisted partition includes a partition number of the respective persisted partition, a version number of the respective persisted partition, and a member identifier that is an indication of which member generated the GUID of the respective persisted partition;
   reporting, to a coordinating member by each active member of the plurality of members, the GUID of each persisted partition of the plurality of persisted partitions that each active member, respectively, has access to;
   determining, by the coordinating member a responsible member from the plurality of active members to recover the first persisted partition to;
   providing, by the coordinating member, a recovery assignment to the responsible member, wherein the recovery assignment instructs the responsible member to recover the first persisted partition; and
   recovering, by the responsible member, the first persisted partition to the random access memory of the computer on which the responsible member executes.

2. The method according to claim 1, wherein the persistent storage comprises a plurality of local disks, the plurality of persisted partitions being persisted in different local disks of the plurality of local disks, and
   wherein each member of the plurality of members has visibility to only the persisted partitions in a corresponding one of the local disks.

3. The method according to claim 1, wherein the GUID for a particular persisted partition comprises information about which member of the plurality of members has access to the particular persisted partition.

4. The method according to claim 3, further comprising: associating a timestamp with each said GUID.

5. The method according to claim 1, wherein the determining that the first GUID corresponds with a most recent version of the persisted partition for which the first GUID and the second GUID were generated comprises:
   resolving each received GUID to obtain the partition number and the version number generated for each persisted partition in the persistent storage.

6. The method according to claim 1, wherein the persistent storage comprises a storage area network (SAN) and the SAN is accessible by the plurality of members.

7. The method according to claim 1, further comprising:
   determining, by the coordinating member and via the member identifier of the first GUID and the reporting by each active member of the plurality of members, that the member that generated the first GUID has access to the partition for which the first GUID was generated.

8. The method according to claim 7, wherein the responsible member is the member that generated the first GUID.

9. The method according to claim 1, further comprising:
   determining, by the coordinating member and via the member identifier of the first GUID and the reporting by each active member of the plurality of members, that the member that generated the first GUID is inactive.

10. The method according to claim 9, wherein the responsible member is a one of the plurality of members other than the member that generated the first GUID.

11. A system for supporting recovery of persisted data from persistent storage, the system comprising:
   a distributed data grid comprising a plurality of server nodes, each server node comprising a microprocessor and a memory;
   a plurality of members of a cluster of the distributed data grid, wherein each of the plurality of members executes on one of the plurality of server nodes and manages partitioned cache content held in the random access memory of the server node on which each member of the plurality of members respectively executes; and
   a coordinating member of the distributed data grid;
   wherein the distributed data grid is configured, during recovery of the persisted data by active members of the plurality of members of the distributed data grid to perform steps comprising:
      accessing the persisted data by each active member of the plurality of members wherein the persisted data comprises a plurality of persisted partitions persisted by each member of the plurality of members, the plurality of persisted partitions each identified by a globally unique identifier (GUID) for each member's respective persisted partition, wherein each GUID for each respective persisted partition includes a partition number of the respective persisted partition, a version number of the respective persisted partition, and a member identifier that is an indication of which member generated the GUID of the respective persisted partition;
      reporting, to the coordinating member and by each active member of the plurality of members, the GUID of each persisted partition of the plurality of persisted partitions that each active member, respectively, has access to;
      determining, by the coordinating member, that a first GUID and a second GUID of the GUIDs generated for each respective persisted partition have a same partition number;
      determining, by the coordinating member and via the version numbers of the first GUID and the second GUID, that the first GUID corresponds with a most recent version of the persisted partition for which the first GUID and the second GUID were generated;
      determining, by the coordinating member and based on the member identifier of the first GUID and the reporting by each active member of the plurality of members of the GUID of each persisted partition of the plurality of persisted partitions that each member, respectively, has access to, a responsible member from the plurality of members to recover the first persisted partition to;
      providing, by the coordinating member, a recovery assignment to the responsible member, wherein the recovery assignment instructs the responsible member to recover the first persisted partition; and recovering, by the responsible member, the first persisted partition to the random access memory of the computer on which the responsible member executes.

12. The system according to claim 11, wherein:
the persistent storage comprises a plurality of local disks, the plurality of persisted partitions being persisted in different local disks of the plurality of local disks, and wherein each member of the plurality of members has visibility to only the persisted partitions in a corresponding one of the local disks.

13. The system according to claim 11, wherein:
the GUID for a particular persisted partition comprises information about which member of the plurality of members has access to the particular persisted partition.

14. The system according to claim 13, wherein:
a timestamp is associated with each said GUID.

15. The system according to claim 11, wherein the determining that the first GUID corresponds with a most recent version of the persisted partition comprises:
resolving each received GUID to obtain the partition number and the version number generated for each persisted partition in the persistent storage.

16. The system according to claim 11, wherein:
wherein the persistent storage comprises a storage area network (SAN) and the SAN is accessible by the plurality of members.

17. The system according to claim 11, wherein the steps further comprise:
determining, by the coordinating member and via the member identifier of the first GUID and the reporting by each active member of the plurality of members, that the member that generated the first GUID has access to the partition for which the first GUID was generated.

18. The system according to claim 17, wherein the responsible member is the member that generated the first GUID.

19. The system according to claim 11, wherein the steps further comprise:
determining, by the coordinating member and via the member identifier of the first GUID and the reporting by each active member of the plurality of members, that the member that generated the first GUID is inactive, and
wherein the responsible member is a one of the plurality of members other than the member that generated the first GUID.

20. A non-transitory machine readable storage medium having instructions stored thereon for supporting recovery of persisted data from persistent storage in a distributed data grid comprising a plurality of members, wherein each of the plurality of members manages partitioned cache content held in the random access memory of a computer on which each member of the plurality of members respectively executes, which instructions, when executed, configure said distributed data grid to perform steps comprising:

accessing the persisted data by each active member of the plurality of members wherein the persisted data comprises a plurality of persisted partitions persisted by each member of the plurality of members, the plurality of persisted partitions each identified by a globally unique identifier (GUID) for each member's respective persisted partition, wherein each GUID for each respective persisted partition includes a partition number of the respective persisted partition, a version number of the respective persisted partition, and a member identifier that is an indication of which member generated the GUID of the respective persisted partition;

reporting, to a coordinating member by each active member of the plurality of members, the GUID of each persisted partition of the plurality of persisted partitions that each active member, respectively, has access to;

determining, by the coordinating member a responsible member from the plurality of active members to recover the first persisted partition to;

providing, by the coordinating member, a recovery assignment to the responsible member, wherein the recovery assignment instructs the responsible member to recover the first persisted partition; and recovering, by the responsible member, the first persisted partition to the random access memory of the computer on which the responsible member executes.

* * * * *

UNITED STATES PATENT AND TRADEMARK OFFICE
CERTIFICATE OF CORRECTION

PATENT NO. : 10,817,478 B2
APPLICATION NO. : 16/227877
DATED : October 27, 2020
INVENTOR(S) : Lee et al.

Page 1 of 1

It is certified that error appears in the above-identified patent and that said Letters Patent is hereby corrected as shown below:

On the Title Page

Column 1, Item (63) under Related U.S. Patent Documents, Line 1, delete "14/281,150" and insert -- 14/271,150 --, therefor.

On page 2, Column 2, Item (56) under Other Publications, Line 5, delete "Hetergeneous" and insert -- Heterogeneous --, therefor.

In the Drawings

On sheet 6 of 14, in FIGURE 6, under Reference Numeral 608, Lines 2-3, delete "RecoveryAssignment" and insert -- Recovery Assignment --, therefor.

In the Specification

In Column 7, Line 20, delete "partitions" and insert -- partitions. --, therefor.

In Column 8, Line 66, delete "GUI Ds" and insert -- GUIDs --, therefor.

In Column 9, Line 13, delete "GUI Ds" and insert -- GUIDs --, therefor.

In Column 9, Line 30, delete "GUI Ds" and insert -- GUIDs --, therefor.

In Column 9, Line 32, delete "GUI Ds" and insert -- GUIDs --, therefor.

In Column 10, Line 34, delete "grid" and insert -- grid. --, therefor.

In the Claims

In Column 13, Line 25, in Claim 16, delete "wherein the" and insert -- the --, therefor.

Signed and Sealed this
Eighth Day of June, 2021

Drew Hirshfeld
*Performing the Functions and Duties of the
Under Secretary of Commerce for Intellectual Property and
Director of the United States Patent and Trademark Office*